United States Patent [19]

Cooper et al.

[11] Patent Number: 4,760,604
[45] Date of Patent: Jul. 26, 1988

[54] PARALLEL, MULTI-UNIT, ADAPTIVE, NONLINEAR PATTERN CLASS SEPARATOR AND IDENTIFIER

[75] Inventors: Leon N. Cooper; Charles Elbaum; Douglas L. Reilly; Christopher L. Scofield, all of Providence, R.I.

[73] Assignee: Nestor, Inc., New York, N.Y.

[21] Appl. No.: 775,144

[22] Filed: Sep. 12, 1985

Related U.S. Application Data

[63] Continuation-in-part of Ser. No. 702,188, Feb. 15, 1985, abandoned.

[51] Int. Cl.[4] .................... G06K 9/62; G05B 13/02
[52] U.S. Cl. ........................... 382/15; 364/715; 382/36
[58] Field of Search .................. 382/15, 36, 37, 38, 382/39; 364/715

[56] References Cited

U.S. PATENT DOCUMENTS

| | | | |
|---|---|---|---|
| 3,601,811 | 8/1971 | Yoshino | 382/15 |
| 3,950,733 | 4/1976 | Cooper et al. | 382/15 |
| 4,030,068 | 6/1977 | Banz | 382/38 |
| 4,044,243 | 8/1977 | Cooper et al. | 364/900 |
| 4,177,448 | 12/1979 | Brayton | 382/39 |
| 4,180,800 | 12/1979 | Isshiki et al. | 382/37 |
| 4,254,474 | 3/1981 | Cooper et al. | 364/900 |
| 4,307,376 | 12/1981 | Miller et al. | 382/36 |
| 4,319,331 | 3/1982 | Elbaum et al. | 382/60 |
| 4,326,259 | 4/1982 | Cooper et al. | 382/15 |
| 4,451,929 | 5/1984 | Yoshida | 382/15 |
| 4,611,347 | 9/1986 | Netravali et al. | 382/38 |

Primary Examiner—Leo H. Boudreau
Attorney, Agent, or Firm—Karl F. Milde, Jr.

[57] ABSTRACT

A system is disclosed for separating and identifying classes of patterns or events which are not necessarily linearly separable. The patterns are represented by an input signal S. The system comprises (1) a plurality of classification units, connected in parallel to receive the input signal S, and (2) a class selection device, responsive to the output signals produced by the classification units, for producing a single output response R representing the class of each respective pattern. In a preferred embodiment each classification unit includes a pattern feature encoding device, responsive to the input signal S, for producing an intermediate signal $F_i$ representative of the features contained in the pattern, and a pattern classifier, responsive to the signal $F_i$, for producing an output signal $R_i$ representative of the respective class of the pattern, as identified by the features encoded by the feature encoding device.

32 Claims, 8 Drawing Sheets

PARALLEL, MULTI-UNIT, ADAPTIVE, NONLINEAR PATTERN CLASS SEPARATOR AND IDENTIFIER

CROSS-REFERENCE TO RELATED PATENT APPLICATION

This application is a continuation-in-part of application Ser. No. 702,188 filed Feb. 15, 1985, of L. N. Cooper, C. Elbaum, D. L. Reilly and C. L. Scofield for "PARALLEL, MULTI-UNIT, ADAPTIVE, NONLINEAR PATTERN CLASS SEPARATOR AND IDENTIFIER", now abandoned.

FIELD OF THE INVENTION

This invention relates to adaptive information processing systems. More particularly it relates to self-organizing input-output devices which function to separate and identify classes of patterns that are not necessarily linearly separable.

REFERENCE TO RELATED PATENTS

The subject matter of this patent application is related to that of the commonly-owned U.S. Pat. Nos. 3,950,733; 4,044,243; 4,254,474 and 4,326,259, all to Cooper et al.

BACKGROUND OF THE INVENTION

The above-referenced patents to Cooper et al. disclose methods and apparatus (systems) that can separate and classify "patterns" or real-world "events" that are not linearly separable. The patterns or events in the outside world can be detected and described by a set of measurements, the results of which are represented by an input signal S comprised of individual signals $s_1, s_2 \ldots s_k$. The signal S could be, for example, a signal coming from a camera registering a scene (pattern) or the output of a microphone detecting some arbitrary sound (pattern).

In a system comprising a Nestor TM adaptive module as described in these patents, all input signals S (which are themselves referred to herein as "patterns") belonging to the same class should elicit the same final response from the system. For example, in the context of an application such as character recognition, any version of a handdrawn "2" seen by the system should result in an output signal which causes the character font member for "2" to be displayed on some output device, such as a video screen, printout, etc.

A system of this type, or so-called Nestor System TM, is an extremely powerful pattern class separator and identifier. For example, this system may be trained with a learning procedure in which the operator need have no knowledge of the complex geography of the multi-dimensional space in which the pattern class separation and identification is being performed. Such a system requires the input signal S to be preprocessed into an intermediate signal F which represents only certain prescribed features of the original patterns. The input signal S normally contains too much irrelevant information for effective pattern recognition by the Nestor System.

Subjecting the input signal S (representing the pattern) to this preprocessing step—referred to herein as "encoding"—should preserve enough information to permit patterns to be distinguished from each other. Information that is irrelevant for learning one class may be important to distinguish some other. For this reason, it may be difficult to choose a single preprocessing strategy that removes all irrelevant information without jeopardizing the ability to distinguish some classes.

The system we describe here can be thought of, in one sense, as a way of linking together a number of such Nestor Systems. Each component Nestor System can be regarded as a complete unit, including its own preprocessing and encoding procedures. A pattern is identified by the responses it produces among these component units. Each unit has its own encoding procedures, different from that of any other. Therefore, it is sensitive to certain types of information in the input signal. The particular set of features it registers may give it a special aptitude for learning some types of pattern classes, but not others. A class will be learned automatically by that unit with the best aptitude for learning it. At the same time, learning other pattern classes may require pooling the resources of several component units, none of which alone has sufficient discriminating skills, by virtue of its preprocessing and encoding properties, to distinguish these classes. In these cases, the system identifies an example of this class by correlating the response of a set of units.

As an example of this, consider once again the task of identifying hand-drawn characters. The pattern properties registered by one unit may give emphasis to certain aspects of the characters but not to others. Specifically, the extracted features may serve well to distinguish among characters with rectilinear shapes, such as "A", "H", "K", "N", etc. but may not provide good separation between characters with circular shapes, such as "B", "C", "Q", etc. Consequently, this unit will distinguish rectilinear shapes while a unit that encodes circular features could learn to separate pattern classes in which circular features are present and distinctive.

Encoding (feature extraction) schemes for hand-drawn characters, audible sounds and numerous other types of patterns are well known in the art and are described in the literature. An overview of this technology for hand-drawn characters is given in *Automatic Recognition of Handprinted Characters—the State of the Art*, by C. Y. Suen, M. Berthod and S. Mori, Proceedings IEEE, Vol. 68, No. 4, April 1980, pp. 469-487.

Not every unit of a Nestor System learns every class. Further, each unit is only looking at a fraction of all the possible pattern properties registered by the system as a whole. Consequently, learning of a pattern class occurs more quickly and more economically (in terms of the size of system memory) than if the system consisted of a single unit which combined the preprocessing and coding of all the individual units in the system. Another advantageous and novel feature of this system and its architecture is that it allows the possibility of incorporating new units into the system over the course of training. This is an especially useful property if the kind of pattern classes that the system is expected to deal with changes substantially over time. Additional units may be incorporated in the course of the system's experience without, in general, the need to retrain the system on the pattern classes it has already learned.

Advantageously, each Nestor adaptive module can be trained to be exceedingly adept and accurate in its classification of certain types of patterns. This sophistication permits a module to classify based on extremely subtle differences between patterns provided that the unit has the necessary preprocessing and encoding to sense those differences. A high level of ability to classify patterns based on one set of criteria does not preclude the ability to use another set of criteria (from another module or set of modules) to classify based on a different set.

The Nestor adaptive module is, itself, a well known device for pattern classification and identification. This device is described, inter alia, in the aforementioned U.S. Pat. Nos. 3,950,733; 4,044,243; 4,254,474 and 4,326,259, to Cooper et al.

SUMMARY OF THE INVENTION

A principal object of the present invention is to provide a pattern class separator and identifier which can separate and identify classes of patterns having a wide variety of salient features.

Another object of the present invention is to provide a pattern class separator and identifier which can separate and identify classes of patterns which may have only small and subtle differences between them.

Still another object of the present invention is to provide a specific software-implemented embodiment of the present invention which is capable of achieving the objects stated immediately above.

These objects, as well as further objects of the present invention that will become apparent from the discussion that follows, are achieved, according to the invention, by providing a pattern classification and identification system comprised of (a) a plurality of classification units, connected in parallel and which receive an input signal S, representing each pattern, and (b) a class selection device, responsive to the output signals produced by the classification units, for producing a single output response R representing the class of each respective pattern.

In a first preferred embodiment of the invention, each classification unit includes both (1) a pattern feature encoding device, responsive to the input signal S, for producing an intermediate signal $F_i(F_1, F_2 \ldots F_i \ldots F_k)$ representative of the features contained in the pattern, and (2) a pattern classifier, responsive to the signal $F_i$, for producing an output signal $R_i(R_1, R_2 \ldots R_i \ldots R_k)$ representative of the respective class of the pattern, as identified by the features encoded by the feature encoding device.

In a second preferred embodiment of the invention, each classification unit includes a pattern feature encoding device of the type just described but the intermediate signals $F_1, F_2 \ldots F_i \ldots F_k$ of all the encoding devices are supplied to a common pattern classifier which produces an output signal $R_N$ representative of the respective class of a pattern. This output signal $R_N$ is passed to the class selection device which recognizes and identifies the selected class.

In a third preferred embodiment of the invention, the input signal S is supplied to a single pattern feature encoding device which produces the intermediate signal F. In this case, each classification unit includes a separate pattern classifier, responsive to the intermediate signal F, for producing the output signal $R_i(R_1, R_2 \ldots R_i \ldots R_k)$ representative of the respective class of the pattern.

The pattern class separator and identifier according to the invention thus takes advantage of the possibility of encoding different sets of features of a particular pattern so that classification of this pattern may be based upon a wide variety of features. Since the pattern classifier is thus able to "see" various aspects of the pattern, its ability to classify the pattern is substantially increased.

Similarly, although only a single pattern feature encoding device may be provided, the provision of a multiplicity of pattern classifiers, looking at a different aspect of the encoding device output and each trained in a slightly different way, makes it possible to separate the pattern into one of a large number of possible classes. It will be appreciated that when a very large number of possible classes are involved, the pattern classifier is able to distinguish between subtle differences in the patterns which it "sees".

To better understand the present invention, consider k units $U_1 \ldots U_k$ of the type described in the U.S. Pat. No. 4,326,259, functioning in parallel (or in sequence). Each unit consists of a means for acquisition of an input signal S, means $C_i$ for coding of the signal into a pattern vector $F_i$ ($1 \leq i \leq k$), and means for comparing the pattern vector to a set of prototypes $[P(j), j=1 \ldots N_i)]_i$ generated in the process of learning and registering an output response $R_i$. These units are autonomously operating devices. A signal S that results from the occurence of some external event (pattern) is encoded by each of the k different codes, identified as $c_1 \ldots c_k$, into intermediate signals $F_1 \ldots F_k$; these signals are then separated into classes to produce an output response $R_1 \ldots R_k$ from each of the units $U_1 \ldots U_k$, respectively.

The k codes $c_1 \ldots c_k$ thus generate k signals, $F_1 \ldots F_k$, each representing different aspects (or features) of the external event. At one extreme, the codes might be orthogonal. In this case, a given representation of an event is coded into one and only one signal $F_j$. The others give zero. (In the example of coding for hand-drawn characters, such a division might be achieved by a coding in which all entries with one stroke are entered into $c_1$, all of those with two strokes into $c_2$, etc.). Then the processing in the k units is completely independent.

At the other extreme the codes might be identical so that $c_1 = c_2 = \ldots c_k$. In this situation nothing is gained over that of a single unit.

In the situation we envisage here, the k codes may or may not be orthogonal, but they are not identical. A given manifestation of an external pattern, in general, is coded into a non-zero signal by some or all of the k codes, $c_1 \ldots c_k$. Each of these codes might emphasize different aspects or features of the incoming event. The information from some codes will serve well in separating certain classes of patterns, while that from other codes will be better suited for separating still other classes of patterns. It may also occur that a pattern is best identified by correlations between the signals resulting from two or more codes.

The k intermediate signals $F_1 \ldots F_k$ are supplied to k pattern classifiers $N_1, N_2 \ldots N_i \ldots N_k$ which, in turn, produce the respective output responses $R_1 \ldots R_k$. Each pattern classifier is preferably a Nestor adaptive module of the type disclosed in the aforementioned U.S. Pat. Nos. 3,950,733; 4,044,243; 4,254,474 and 4,326,259. Such an adaptive module comprises a number M of input terminals, each coupled to receive one scalar component f ($f_{1i}, f_{2i} \ldots f_{Mi}$) of the intermediate signals $F_i$; a number N of summers, each summer having M inputs and an output and being operative to provide a scalar component signal $r(r_{1i}, r_{2i} \ldots r_{Ni})$ at its output representing the sum of the signal representations applied to its inputs; at least a number N of scalar mutlipliers, each coupled to one of the summers, for producing a second scalar component signal $\lambda\, r_i$, where $\lambda$ is a multiplier factor; at least a number N of threshold devices, each coupled to one of the scalar multipliers, for producing a scalar output response $p_i$ ($p_1, p_2 \ldots p_i \ldots p_N$) when the second scalar component signal exceeds a prescribed threshold level $\theta_i$; and a number $M \times N$ of junction elements, each junction element coupling one of the input terminals with one of the summers and providing a transfer of information from the respective input terminal to the respective summer in dependence upon the signal appearing at the respective input terminal and upon the junction element transfer function. When in a training mode, the transfer function of at least one of the junction elements is modified in dependence upon the incoming signal applied to the junction element and the output signal of the summer with which the junction element is associated. In addition, at least one of the scalar multiplier factors $\lambda$ is modified so as to confine the response of the associated prototype to a single class of patterns.

The Nestor adaptive module operates to compare the incoming pattern vector $F_i$ to a set of prototypes $P(j)$, $j=1 \ldots N$, and produce an output response $R_i$ which is indicative of the prototype or prototypes (if any) that respond to or match the pattern vector $F_i$. As each Nestor adaptive module is trained, it develops a unique set of prototypes for classification of incoming patterns. Given an input vector $F_i$, representing a pattern from a class that the system has been trained to recognize, and given a particular set of prototypes, there will be a high probability that the pattern will fall within the classification fields of one or more prototypes for that class.

The development of prototypes in each Nestor adaptive module $N_i$ allows it to evolve and implement its own classification strategy on incoming patterns. The strategy it develops may be based on looking at pattern properties that are uniquely registered by its associated encoder, $C_i$. Moreover, even if two or more adaptive modules derive their inputs from the same or equivalent encoders, possible differences in the parameters controlling the development of their prototypes sets will cause them to implement effectively different classification strategies applied to the same input patterns. The system according to the invention therefore provides a means by which any number of such classification units, working in parallel (or in sequence) can organize themselves to select the best code as well as the correlations between codes for a pattern and thus arrive at a highly efficient means of separating and classifying the various patterns.

For a full understanding of the present invention, reference should now be made to the following detailed description of the preferred embodiments of the invention and to the accompanying drawings.

DESCRIPTION OF THE PREFERRED EMBODIMENTS

The present invention and its preferred embodiments will now be described with reference to FIGS. 1-9 of the drawings.

Figure 1:
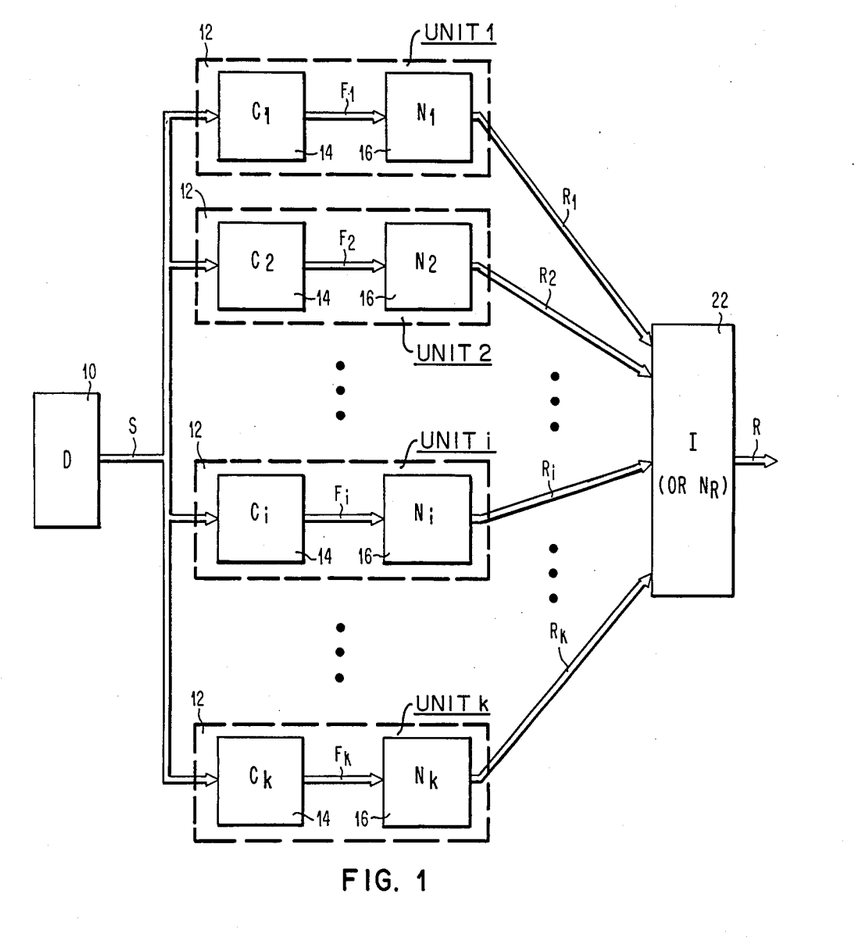
FIG. 1 is a block diagram of a pattern class separator and identifier according to a first preferred embodiment of the present invention.

A first preferred embodiment of the present invention is illustrated in FIG. 1. This embodiment will be described here in general terms sufficient for an understanding of the present invention. Details of this embodiment are described below with reference to FIGS. 4-9.

As illustrated in FIG. 1, the system includes a detector 10 which produces a signal vector S comprised of individual scalar component signals $s_1, s_2 \ldots s_M$ representing a pattern or "event" in the outside world. The detector 10 is a conventional device such as an array of light sensors, each of which produces one of the output signals $s_1, s_2 \ldots s_M$.

The signal vector S is presented in parallel to k pattern classification "units" 12; namely, unit 1, unit 2, ... unit i, ... unit k. Each unit (e.g., unit i) comprises a pattern feature encoding device 14($C_i$) and a pattern classification device 16($N_i$). Preferably, each of the encoding devices $C_1, C_2 \ldots C_i \ldots C_k$ encodes a different set of features in the pattern, represented by the input signal S, by means of a unique code $c_i$ ($c_1, c_2 \ldots c_i \ldots c_k$). In this way, the intermediate signals $F_1, F_2 \ldots F_i \ldots F_k$ produced by the respective encoding devices carry different information.

The individual pattern classification devices 16 (e.g., device $N_i$) each preferably consists of a Nestor adaptive module of the type disclosed in the aforementioned U.S. Pat. Nos. 3,950,733; 4,044,243; 4,254,474 and 4,236,259. This adaptive module operates to compare an encoded pattern vector $F_i$ with a set of "prototypes" for pattern classes which the module has learned through training. The Nestor adaptive module which is able to classify the pattern vector—by testing it against its set of prototypes—produces an output response $R_i$. Since each of the classification devices 16 provides a different set of prototypes, as a result of its training, against which to test the pattern vector $F_i$, there is a high probability that one of the classification devices will be able to classify the encoded pattern.

If we assume that the intermediate signal $F_i$ is a pattern vector comprising M scalar signals ($f_1, f_2 \ldots f_M$) and if we assume that the output response $R_i$ of a classification device 16 $N_i$ is a response vector consisting of N scalar signals ($r_1, r_2 \ldots r_N$) so that the classification device has M inputs and N outputs, a Nestor adaptive module forming this classification device 16 will comprise:

(1) a plurality M of input terminals, each coupled to receive one of the scalar intermediate signals $f_1, f_2 \ldots f_M$;

(2) a plurality of summers, each summer having M inputs and an output and being operative to provide a scalar component signal r at its output representing the sum of the signal representations supplied to its inputs;

(3) a number N of scalar multipliers, each coupled to one of the summers, for producing a second scalar component signal $\lambda r_i$, where $\lambda$ is a multiplier factor;

(4) a number N of threshold devices, each coupled to one of the scalar multipliers, for producing a scalar output response $p_i(p_1, p_2 \ldots p_i \ldots p_N)$ when the second scalar component signal exceeds a prescribed threshold level $\theta_i$; and (5) a plurality M×N of junction elements, each junction element coupling one of the input terminals with one summer and providing a transfer of information from the respective input terminal to the respective summer in dependence upon the signal appearing at the respective input terminal and upon the junction element "transfer function".

While the Nestor adaptive module is being trained, it also includes a suitable controller for modifying (1) the transfer functions of some of the junction elements in dependence upon the incoming signal applied to it and the output signal of the summer with which the respective junction element is associated, (2) the scalar multipliers $\lambda$; and (3) the thresholds $\theta$.

The outputs $R_1, R_2 \ldots R_i \ldots R_k$ of all of the classification units 12 are supplied to a common pattern class identifier 22 which performs the final recognition function and produces a common output response R (consisting of scalar signals $r_1, r_2 \ldots r_N$). This pattern class identifier may take one of any number of forms; for example, the forms shown in FIGS. 3, 4 and 8 of the aforementioned U.S. Pat. No. 4,326,259. The identifier 22 may also be implemented by a Nestor adaptive module of the type disclosed in the aforementioned U.S. Pat. Nos. 3,950,733; 4,044,243; 4,254,474 and 4,326,259 and summarized briefly above. An alternative implementation of identifier 22 is discussed below.

Figure 2:
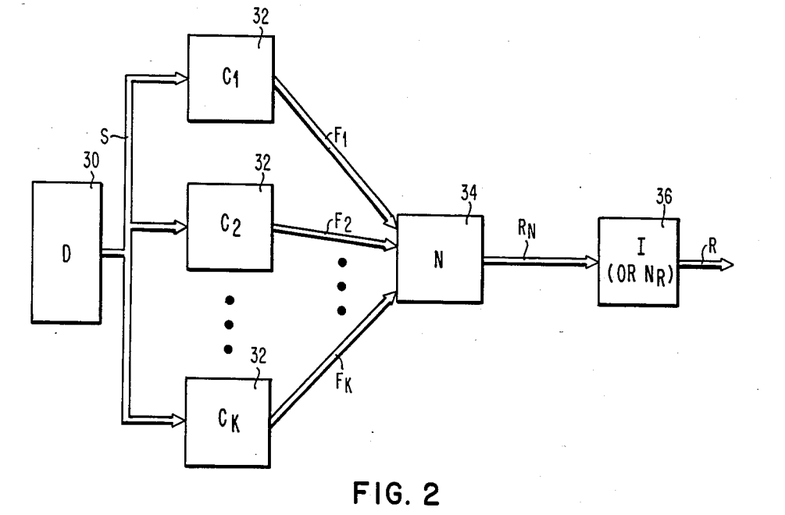
FIG. 2 is a block diagram of a pattern class separator and identifier according to a second preferred embodiment of the present invention.
Figure 3:
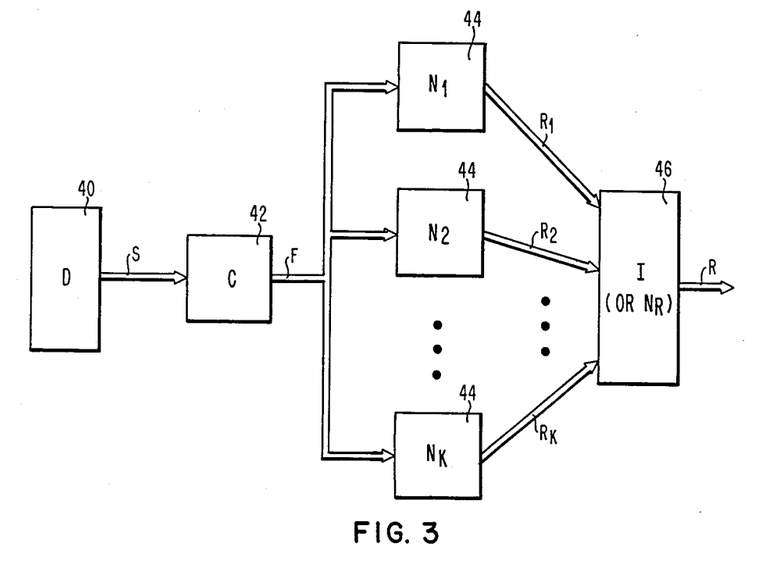
FIG. 3 is a block diagram of a pattern class separator and identifier according to a third preferred embodiment of the present invention.

While FIG. 1 illustrates the preferred embodiment of the present invention and best mode known to the inventors for implementing the invention, FIGS. 2 and 3 illustrate second and third preferred embodiments, respectively, which also provide extremely powerful pattern class separation and identification. In the embodiment of FIG. 2, the signal S produced by the detector 30 is presented in parallel to k coding devices 32 ($C_1, C_2 \ldots C_k$). Each coding device produces an intermediate signal $F_1, F_2 \ldots F_k$, respectively, which is passed to a common pattern classification device 34. Preferably, this classification device is a Nestor adaptive module, as described above.

Since the pattern classification device 34 receives pattern vectors from all encoding devices, and therefore "sees" all the features of the pattern which are variously encoded by the encoding devices, its ability to classify is substantially enhanced over a classification unit which sees a pattern through only one set of encoded features as would be provided by only a single encoding device.

In this case, the single classification unit 34 produces a single output response $R_n$ which is passed to the pattern class identifier 36 for selection of a particular class.

The third preferred embodiment of the present invention, shown in FIG. 3, provides the converse situation wherein a single coding device 42, which receives the input signal S from the detector 40, produces and presents in parallel a common intermediate signal F to a number of pattern classification devices 44. The respective output signals $R_1, R_2 \ldots R_k$ of these classification devices 44 are supplied to a common pattern class identifier 46 which produces the output response R.

As described above in connection with the first embodiment shown in FIG. 1, both the pattern classification devices 44 and/or the pattern class identifier 46 are preferably Nestor adaptive modules.

Whereas the embodiment shown in FIG. 2 provides an enhanced ability to classify patterns due to the various sets of features which are encoded by the plural encoding devices, the embodiment of FIG. 3 exhibits an enhanced ability to classify due to the plural sets of prototypes provided by the multiplicity of classification devices 44. Since the pattern vector F is compared with a number of different and unique sets of prototypes, there is a substantially greater chance that it will fall within the sphere of one of these prototypes.

Figure 4:
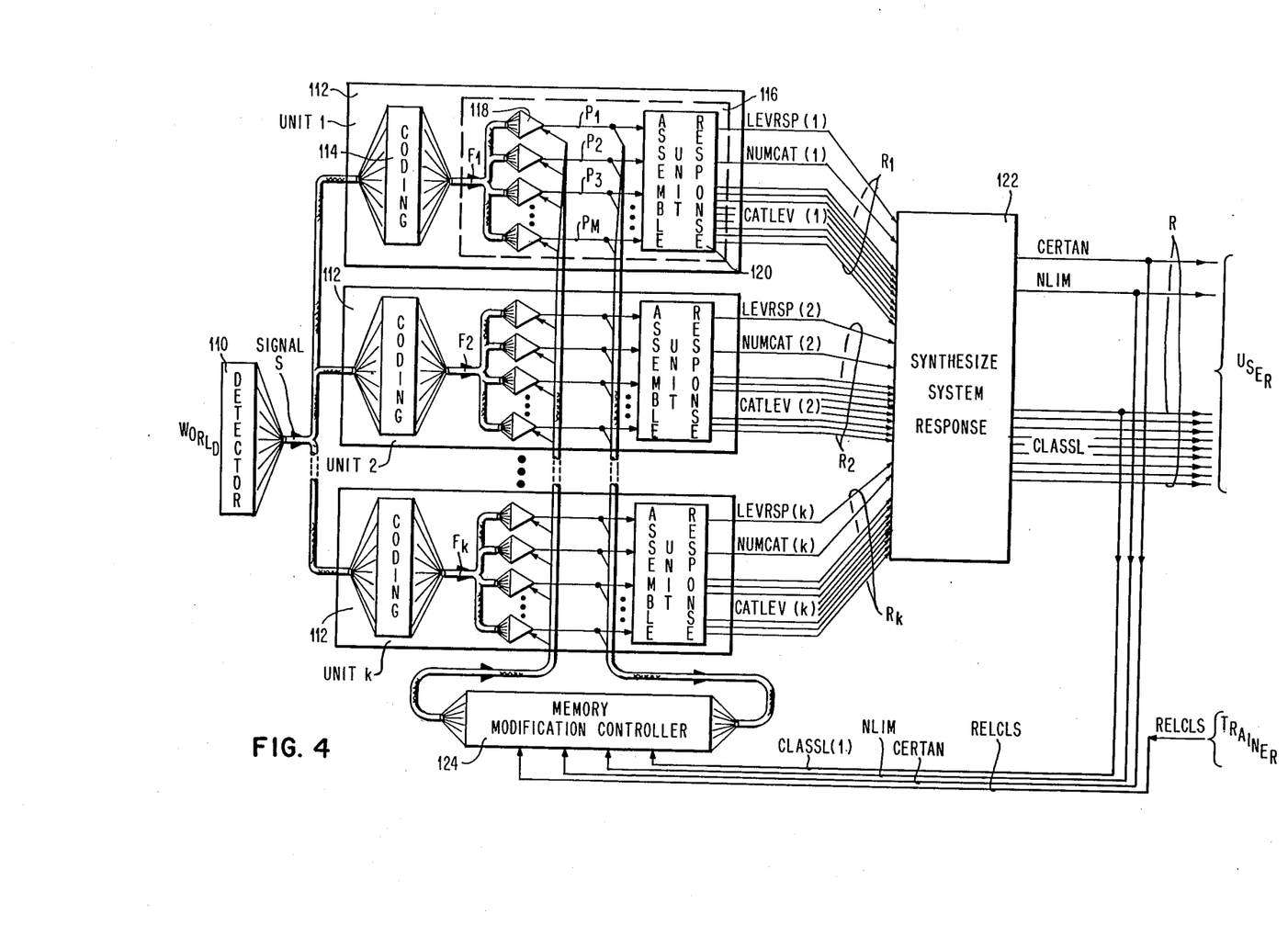
FIG. 4 is a detailed block diagram of the aforementioned first preferred embodiment of a pattern class separator and identifier.
Figure 5:
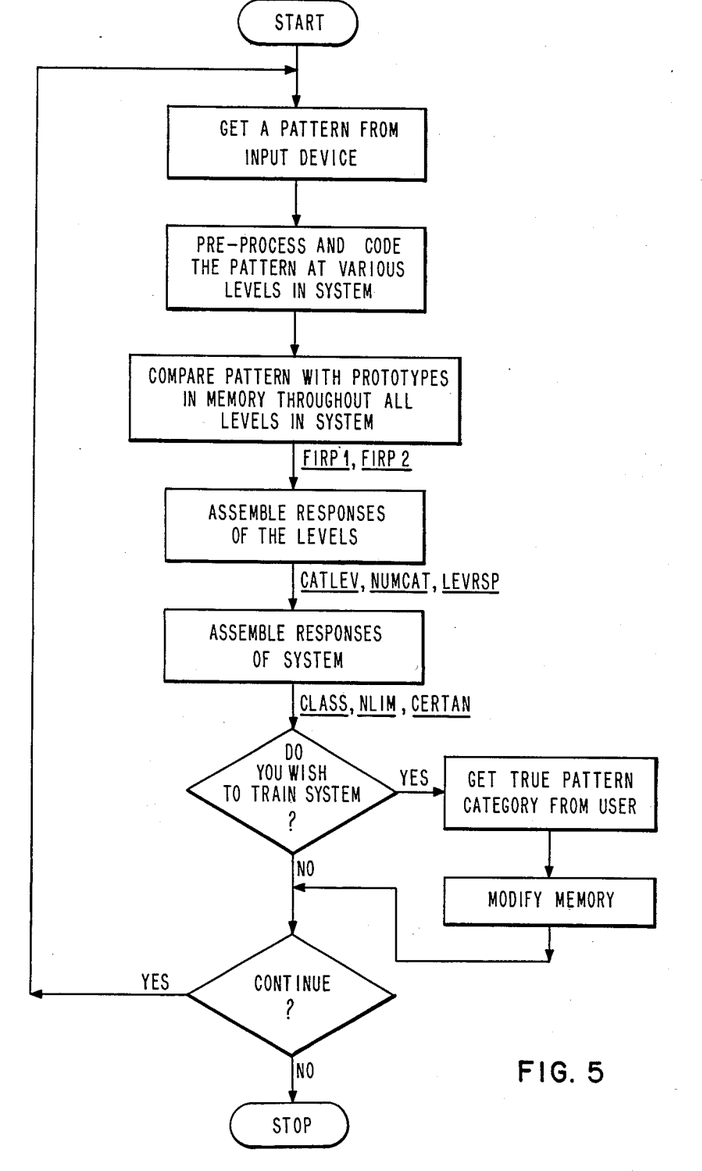
FIG. 5 is a flow diagram depicting an algorithm for a software system (Nestor System TM) implementing the pattern class separator and identifier illustrated in FIG. 4.

FIG. 4 shows the preferred embodiment of FIG. 1 in greater detail. As described in the U.S. Pat. No. 4,326,259, referred to above, the system is responsive to an input signal S which is comprised of a large number of digital signal components $s_1, s_2 \ldots s_N$. Alternatively, the signal S may consist of one or more analog signals. This signal vector S is generated by a detector 110 that is responsive to real world "patterns" or "events" to be classified and identified. For example, the detector 110 may be a character scanner which detects the shape of hand-drawn characters. As another example, the detector 110 may be a microphone which responds to audible sounds and produces a single analog signal S.

The input signal S is applied in parallel to k "classification units" 112, designated unit 1, unit 2 ... unit k. Each of these units comprises a pattern feature encoding device 114 that receives the input signal S and produces an intermediate signal $F_i$ (i.e., one of $F_1, F_2 \ldots F_k$) representative of certain features contained in the pattern represented by the signal S. Advantageously, each of the coding devices 114 is responsive to and encodes a different set of features in the pattern so that all of the signals $F_i$ produced by the coding devices carry information that is distinct and different from each other.

Each classification unit 112 also comprises a pattern classification device 116 which is responsive to the intermediate signal $F_i$ and produces an output signal $R_i$ (i.e., one of $R_1, R_2 \ldots R_k$) representative of the class or possible classes of the pattern represented by the input signal S, as this pattern is identified by the features encoded by the coding device 114. The pattern classification device 116 is preferably a pattern class separator and identifier of the type disclosed in the aforementioned U.S. Pat. No. 4,326,259. As indicated in FIG. 4, this classification device comprises a plurality of assemblies 118, designated "prototypes", which may be similar or identical to the assembly i illustrated in FIG. 7 of the aforementioned U.S. Pat. No. 4,326,259. The assemblies 118 produce outputs $p_1, p_2 \ldots p_M$ which are applied to a device 120 that assembles the responses of the assemblies 118 and produces, if possible, a response $R_i$ identifying the pattern class or set of possible pattern classes. For example, this pattern class identifier may be of the type illustrated in FIG. 8 of the aforementioned U.S. Pat. No. 4,326,259.

In the preferred embodiment of the invention to be described below, the classification units 116 are implemented by system software in a general purpose digital computer and report responses $R_1, R_2 \ldots R_k$ each consisting of variables LEVRSP, NUMCAT and CATLEV. The significance and definition of these variables will be described below. Suffice it to say, at this point, that the responses $R_i$ produced by the k classification units 112 are applied in parallel to a class selection device 122 that produces a single output response R representing the class of the pattern represented by the input signal S. In the preferred embodiment to be described below, the response R comprises the variables CERTAN, NLIM and CLASSL.

As is described in the aforementioned U.S. Pat. Nos. 3,950,733; 4,044,243 and 4,326,259, the system may be operated in two distinct modes: (1) a learning or training mode wherein weighting factors, multipliers and threshold levels within the pattern classification devices 116 are modified so that the system will learn to recognize new patterns it has never "seen" before and improve its recognition of previously-seen patterns; and (2) a normal or trained mode wherein the weighting factors, multipliers and threshold levels are held constant. In the training mode only, the system requires a memory modification controller 124 which modifies the weighting factors, multipliers and threshold levels in the manner described in the aforementioned patents.

The pattern class separator and identifier illustrated in FIG. 4 may be implemented either in hardware or in software. As mentioned above, the pattern feature encoding devices may be implemented in the manner described by C. Y. Suen et al. in *Automatic Recognition of Handprinted Characters—the State of the Art*, referred to above.

The pattern classification device 116 in each classification unit 112 as well as the class selection device 122 will now be described with reference to FIGS. 5–9 of the drawings which illustrate algorithms, according to the preferred embodiment, for implementing these devices in software. In this description certain terms have been given unique and precise meanings which are set forth in the attached Appendix.

I. Memory

A. The "Prototype"

As described in the U.S. Pat. No. 4,326,259, memory in a Nestor adaptive module is composed of "prototypes". Each prototype has some number of input lines and one output pathway through which it communicates with other elements in the system. Each prototype has associated with it a set of weighting factors (one for each input line), the prototype vector, and a threshold governing whether it is "on" or "off". The threshold, which defines a "region of influence" for the prototype, is modifiable when the adaptive module is in the training mode. Each prototype is associated with a particular class. Finally, each prototype belongs to a particular unit (unit 1, unit 2 . . . unit k) within the system.

B. P1 and P2 Prototypes

There are two different types of prototypes in the memory of the Nestor adaptive module: Phase-1 (P1) prototypes and phase-2 (P2) prototypes. Among the labels associated with a prototype is one that indicates its "phase". The distinction between the two types of prototypes lies primarily in the extent to which they can influence the classification of the pattern within a given unit of the system. P1 prototypes can direct the response of the system unambiguously, whereas P2 prototypes, when fired, can only indicate that an incoming pattern, represented by the signal S, *may* fall within a designated one of a number of classes.

C. Pattern-Prototype Comparison

Figure 6:
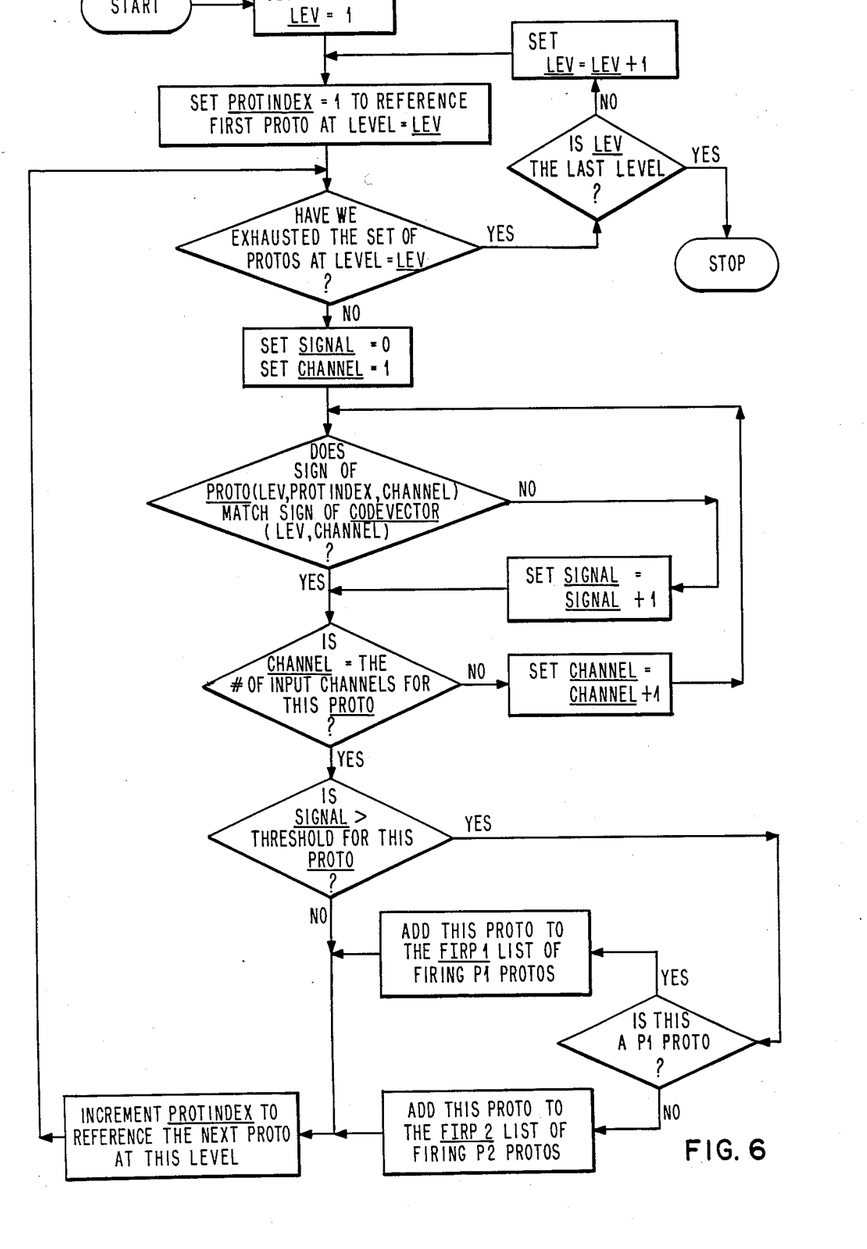
FIG. 6 is a flow diagram depicting an algorithm for the pattern-prototype comparison within the pattern classification units in the system of FIG. 5.

To identify the class of a pattern, the pattern is compared with a group of prototypes in memory. The pattern appears to a prototype as a set of signals appearing on its N input lines. The operation of comparing a pattern and a prototype can take any of several forms. In one method the signal on each prototype line ($f_j$) is multipled with the weight assigned to that line ($P_j$), and the resultant N products are summed to produce the total integrated signal seen by the prototype.

$$d = \sum_{j=1}^{N} P_j \times f_j$$

This signal d is compared against the prototype threshold $\theta$. If it exceeds that threshold, the prototype is said to "fire"; if it does not, the prototype is silent.

$d > \theta$ (prototype fires)

Another method of comparison is useful if the signals arriving at the prototype input lines are binary, each line carrying either a positive or negative spike. In this case, the prototype weighting factor assigned to that line is itself a binary number. In this method, the total prototype activity is a count of the number of input lines on which the sign of the pattern signal does not match the sign of the weighting factor.

$$d = \sum_{j=1}^{N} u_j$$

where $u_j = 1$ if Sign $(f_j) \neq$ Sign $(P_j)$
$\phantom{u_j} = 0$ otherwise

This total number of unmatched signs is then compared against the prototype threshold. If the unmatched sign count is less than the threshold, the pattern fires; if it is greater than or equal to the threshold, the prototype is silent. Thus, in this method, we have $d < \theta$ (prototype fires)

D. Parallelism in the Nestor Adaptive Module

An important feature of the Nestor adaptive module is that the comparison of a pattern with each of the relevant prototypes (either some subset or the entire memory) can occur simultaneously. Additionally, in the comparison of a pattern with a given prototype, the operation performed on a given input line (either multiplication or sign comparison) can be performed simultaneously on all input lines. This rich parallelism is an inherent feature of the Nestor adaptive module.

II. Synthesis of Response

The result of comparing the pattern with prototypes at various units of the system is a set of prototypes that are firing, distributed over the different units. Prototypes firing within a unit cause the unit to emit a response, and the responses of the various k units interact to produce the ultimate output of the system.

A. Response of a Classification Unit

Figure 7:
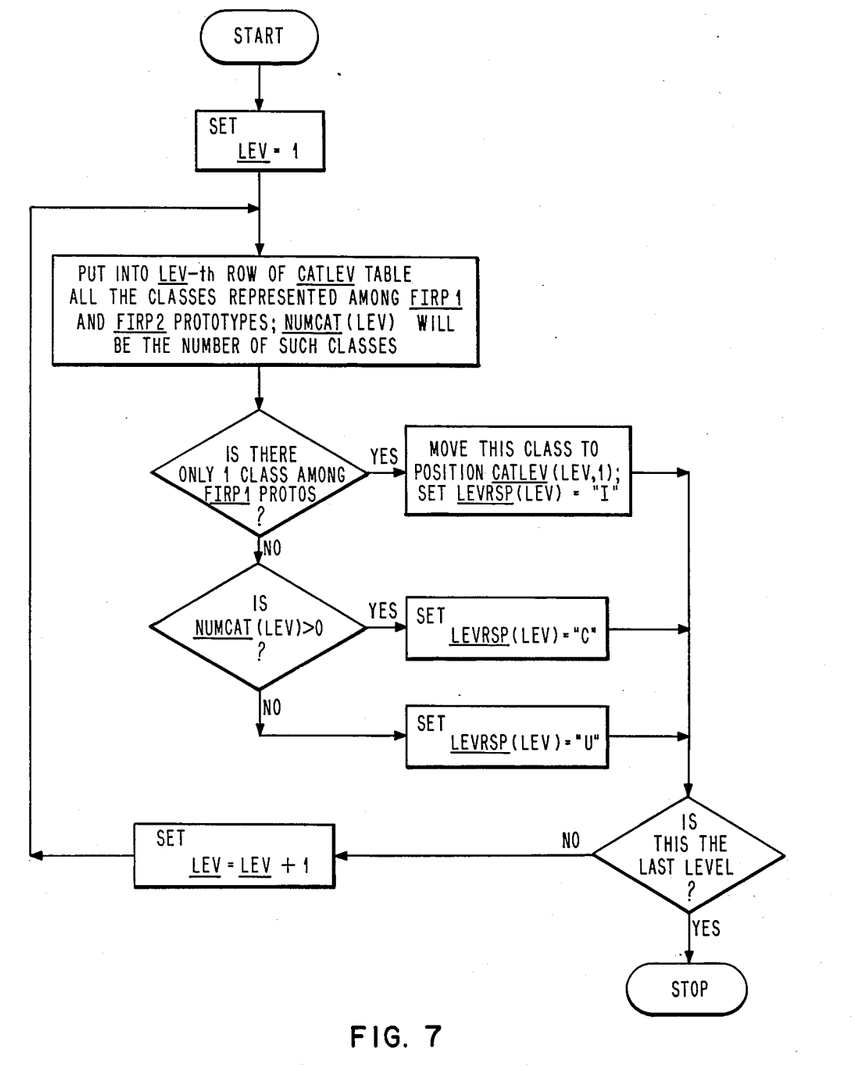
FIG. 7 is a flow diagram depicting an algorithm for assembling the responses of the classification units in the system of FIG. 5.

The output $R_j$ of the j-th classification unit 112 is composed of a list of classes (CATLEV), the number of classes in that list (NUMCAT) and a flag LEVRSP that characterizes the type of response from the unit. If the unit can unambiguously assign a classification to the pattern, then the type of unit response is LEVRSP=-"IDENTIFIED". If the unit can only suggest a possible classification or is undecided among several likely candidate classes, then the type of response is LEVRSP=-"UNCERTAIN". Finally, if the unit is unable to make any classification on the pattern, the response type is LEVRSP="UNIDENTIFIED".

To understand how the firing of P1 and P2 prototypes can differently affect the response of a unit, consider the case of a unit having only one firing prototype. If the prototype is P1, then the response of the unit is to unambiguously assign the class of this prototype to the pattern (LEVRSP="IDENTIFIED"). If the prototype is P2, the unit can only suggest this class as a possible identity for the pattern. The response of the unit is uncertain (LEVRSP="UNCERTAIN"). Regardless of how many P2 prototypes might be firing for this class in the unit, the response type of the unit would still be "UNCERTAIN". In the process by which the unit responses combine to produce a system classification, units producing unambiguous assignments dominate over those yielding uncertain ones.

In the general case, prototypes firing within a unit determine its response according to the following rules. If there are firing prototypes within a unit, then the classes represented among them are entered into CATLEV, and NUMCAT>0. If at least some of the firing prototypes are P1 prototypes and if the set of classes associated with these P1 prototypes consists of only one class, then this class is placed first in CATLEV and the unit response type is LEVRSP="IDENTIFIED". In any other circumstances where there are firing prototypes, the response type of the unit is LEVRSP="UNCERTAIN". If there are no firing prototypes, then NUMCAT=0 and LEVRSP="UNIDENTIFIED".

B. Response of the System

Figure 8:
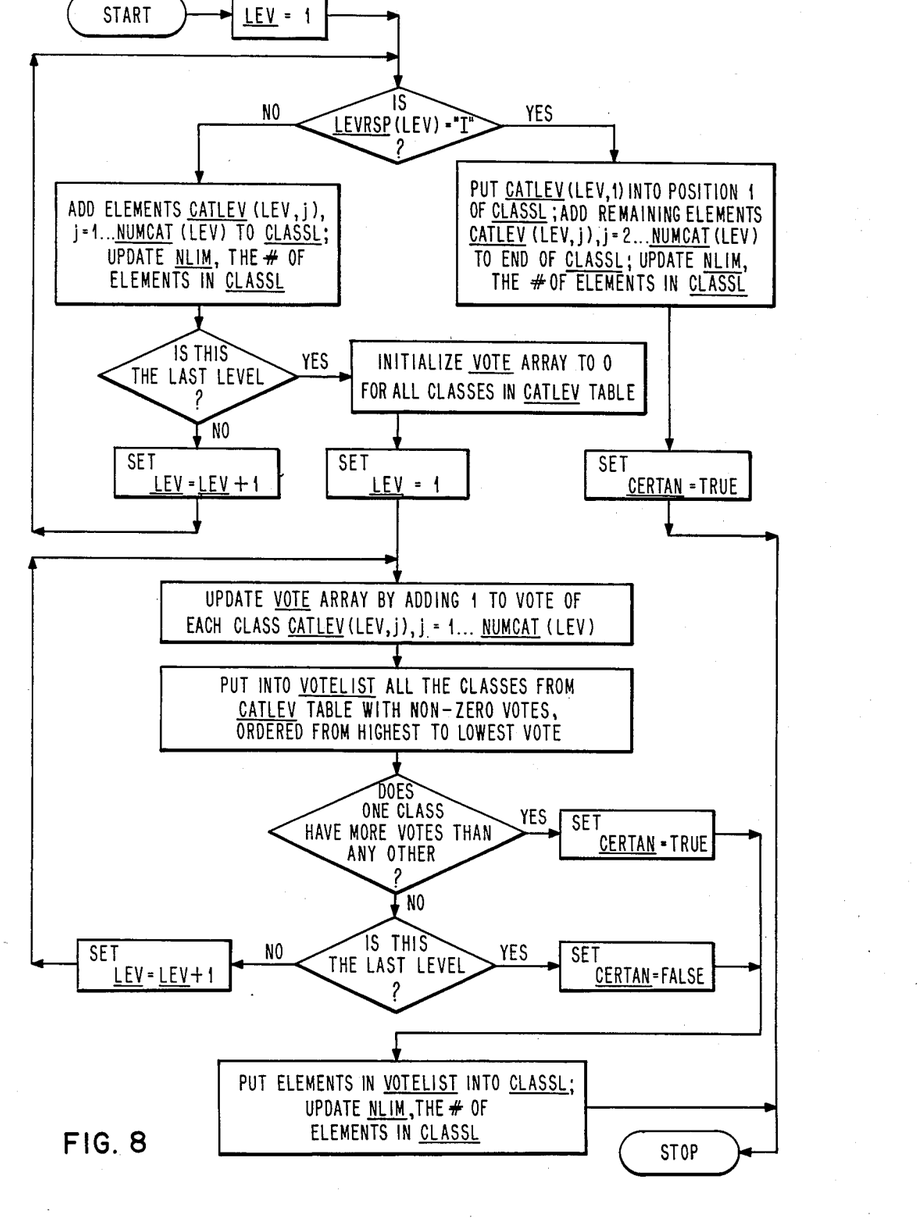
FIG. 8 is a flow diagram depicting an algorithm for assembling the response of the system of FIG. 5.

The response of the system's class selection device 122 consists of a list of categories CLASSL, the number of elements in this list, NLIM, and a logical flag, CERTAN. If CERTAN has the value true, the system has identified the pattern as belonging to the first class listed in CLASSL. (The system response is IDENTIFIED.) If CERTAN is false and NLIM>0, then the system is UNCERTAIN about the identity of the pattern but has narrowed the range of possibilities to one of the NLIM elements listed in CLASSL. They are ordered from most likely to least likely. (Note that it is possible for the system to be uncertain despite the fact that there might be only one class in CLASSL. The system offers this class as a likely but not a definite classification.) If NLIM=0, then the system response is UNIDENTIFIED.

To synthesize the system response from the individual classification unit outputs, the units can be assigned a priority that determines the order in which their responses are evaluated. This establishes a hierarchy among the units, and the units are referenced by this priority number. For example $U_1$ may have the highest priority, $U_k$, the lowest.

To compose the system response, the individual units are searched in the sequence 1 through k, stopping at the first unit whose LEVRSP is "IDENTIFIED". Let the priority index of this unit be IDNLEV ($1 \leq$ IDNLEV$\leq$k). The first class listed in CATLEV for the IDNLEV unit is put into the first position of CLASSL. Additionally, classes listed in the CATLEV's for the units 1 through (IDNLEV-1) are put in CLASSL starting at position 2, possibly ordered in any number of ways; e.g., frequency of occurence among units, average priority value of the units responding for the class, etc. CERTAN is set to true, and the system response is IDENTIFIED.

If the search through the units reveals no unit for which LEVRSP is "IDENTIFIED", then either all the units have LEVRSP of "UNIDENTIFIED" or at least one unit has LEVRSP="UNCERTAIN". If all have LEVRSP="UNIDENTIFIED" then NLIM=0 and the system response is UNIDENTIFIED.

It is possible to take advantage of a hierarchial arrangement of units to reduce the average number of units "polled" (and thus the average number of computations performed) before a system classification emerges. In this spirit, computations are performed within each unit down to the unit priority at which an unambiguous classification arises. On the other hand, unit priorities need not be unique. The same priority can be assigned to a set of units. All units at the same priority function in parallel. A pattern that is processed by one unit at a given priority must be processed in any and all other units with the same priority. This gives each such unit the same opportunity to contribute to the system response.

C. Vote-Counting

If all classification units have LEVRSP="UNCERTAIN", then vote-counting is done among the units in an attempt to correlate the class outputs of one unit with the class outputs of others. As an example of this correlation, assume $U_1$ has class outputs (a,b) and $U_2$ has class outputs (b,c). A vote-counting scheme which counts the units voting for classes a,b,c might assign them votes 1,2,1, respectively. The system would then choose b as the category of the pattern. To do the vote-counting, the units are searched in the sequence of their priority, and the class votes are updated after each unit. At priority j, the vote count of a class is defined as some function of the number of units with priority numbers less than or equal to j whose class outputs include the given class. If among all the highest priority units, one class has more votes than any other, then this class is declared the winner and the vote counting ends. If no winner is found then vote counting is updated by polling all the units at the next highest priority and looking for a winning class. Assuming a winner has been found after vote counting down to some priority, the class outputs of the units polled go into CLASSL, ordered from highest to lowest vote. If there was a single class that had more votes than any other class, then CERTAN is set to true, and the system response is IDENTIFIED. If, after vote-counting, no single class emerges with more votes than any other, then CERTAN is set to false and the system response is UNCERTAIN.

III. Modifying Memory

Figure 9:
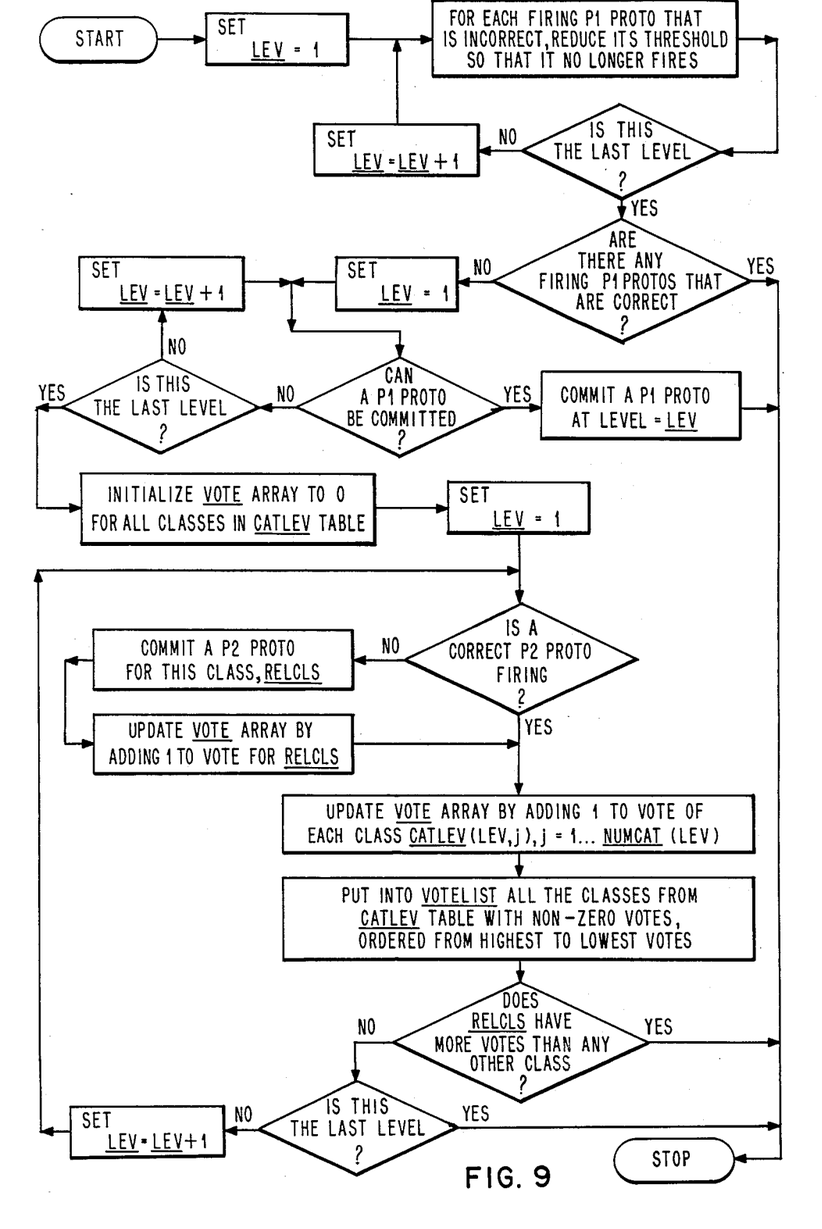
FIG. 9 is a flow diagram depicting the learning algorithm for modifying the memory in the classification units in the system of FIG. 5.

Modifications to memory of a Nestor adaptive module occur during training in response to the presentation of a pattern and its class, the latter typically being supplied by the user. The basic operations involved in changing the module memory are (1) the commitment of a P1 prototype, (2) reduction of the threshold of a P1 prototype, (3) transformation of a P1 prototype into a P2 prototype and (4) the commitment of a P2 prototype.

A. Commitment of a P1 Prototype

The process for commitment of a P1 prototype within a classification unit is based on the procedures for prototype commitment as discussed in the U.S. Pat. No. 4,326,259. If a P1 prototype is to be committed in $U_j$, then the pattern code vector in this unit $F_j$ becomes a new prototype vector P(m) in $U_j$, with the class of the pattern becoming the class of the newly created prototype. As has been discussed elsewhere, the threshold of a prototype defines a "region of influence" in the multidimensional pattern space in which the prototype vector is located. (This is true irrespective of the particular details of pattern-prototype comparison.) The influence region is centered on the prototype and extends for some distance surrounding it. This distance is determined by the threshold. The threshold of a newly committed prototype is initialized to a value less than or equal to the distance to the nearest prototype (of P1 or P2 type) of a differing class or some default value.

Prototypes must have a certain minimum threshold. If the threshold to be assigned to a newly committed P1 prototype is less than this cutoff, then the attempt at P1 commitment fails and the P1 prototype with its vector and class cannot be added to the memory of this unit.

B. Reduction of Prototype Threshold

Reduction in the threshold of a prototype is designed to modify the threshold of the prototype so that, in a subsequent comparison of this pattern with the prototype, the prototype does not fire. In general, this involves setting the threshold of the prototype to some number less than or equal to the distance between the pattern and the prototype.

C. Transformation of a P1 to a P2 Prototype

A P1 prototype can be transformed into a P2 prototype if, in the process of reducing the size of its threshold, it becomes necessary to diminish it below the cutoff for P1 thresholds. When this occurs, the prototype is flagged as a P2 prototype and its threshold is set to some number between the P1 cutoff and the distance to the closest P1.

D. Commitment of P2 a Prototype

If it is desired to commit a P2 prototype at some unit, the code vector and class of the input pattern becomes the prototype vector and class at the given unit. The prototype is flagged as a P2 prototype. Its threshold is set to either the distance to the nearest P1 prototype or to some percentage of the dimensionality of the space, whichever is smaller.

E. Algorithm for Learning

The algorithm describing how these different mechanisms are orchestrated in the process of learning has a number of variations. In general terms, it can be outlined in the following way. Let a prototype whose class is different from that of the input pattern be known as an incorrect prototype. A prototype whose class matches that of the incoming pattern will be referred to as a correct prototype.

The first step in modifying memory is to reduce the thresholds of all firing incorrect P1 prototypes so that they no longer fire in response to the presently occurring pattern. (In different versions of the algorithm, this threshold modification of the firing P1 prototypes occurs only for units of priority lower than that of the unit that identified the pattern.) If after this is done, the pattern is not correctly identified, the system attempts to commit this pattern as a P1 prototype in a unit with the highest priority possible that can accommodate a new P1 prototype.

If the pattern cannot be committed as a P1 prototype at any unit, then, beginning with the highest priority unit, $U_1$, the system will commit the pattern as a P2 prototype as long as a correct P2 prototype is not already firing. Vote-counting is repeated. If the system response is now such that CERTAN=true and the first element of CLASSL is the correct classification, then this pattern introduces no further changes to memory. Alternatively, if the system response is not one of correct classification of the pattern, then P2 commitment is attempted for the next lowest priority unit, $U_2$, and vote-counting is again repeated. The process ends when the correct class has become the unambiguous system response or after all the units with the lowest priority have been processed. In the latter case, though uncertain, the system will offer a set of classes as most likely candidates for the pattern identity, and this set will necessarily include the correct pattern class.

IV. Examples of Operation of the System

A. Case I—Selection for the Separating Code

As an illustration of the functioning of the system, consider the case in which there are two codes $c_1$ and $c_2$ such that the various representations of the pattern class "a" and well separated by $c_1$ but confused with another class of patterns "b" by $c_2$. In the spaces of $c_1$ and $c_2$ we might therefore have the boundaries of "a" completely separate from the boundaries of "b" in $C_1$; however, in $C_2$ a part of "a" may occupy the same region as a part of "b". Clearly $c_1$ will easily separate and classify a and b while $c_2$ will have great difficulty in separating them. (In practice, a device based on $c_2$ will not be able to reliably classify examples of a and b.) We will see that, independently of the way in which the priority is assigned to the two units implementing these two codes, the system will be able to select $c_1$ as the code in which to develop prototypes that separate these two pattern classes.

Assume that $c_1$ is implemented by $U_1$, and $c_2$ by $U_2$.

$$c_1 \rightarrow U_1$$

$$c_2 \rightarrow U_2$$

($U_1$ has the higher priority.) In this case, $U_1$ acquires P1 prototypes, the influence regions of the prototypes are adjusted in the standard fashion, and the memory of the system converges to distinct coverings of the a and b territories in $U_1$.

Consider now that $c_2$ is implemented by $U_1$, and $c_1$ by $U_2$.

$$c_2 \rightarrow U_1$$

$$c_1 \rightarrow U_2$$

Again, $U_1$ begins to acquire P1 prototypes. However, in the course of training, they are reduced to P2 prototypes because a P1 influence field of any significant extent will result in classification errors. When this occurs, $U_2$ will begin to acquire P1 prototypes. Their influence field sizes will be modified to cover and separate the two class regions. As $U_2$ begins to correctly classify the incoming events, prototype commitment in $U_1$ will cease. In the course of training out the incorrect responses of $U_1$, its remaining protoypes will all be converted to P2. Thus, the response type of $U_1$ will be either "UNIDENTIFIED" or "UNCERTAIN". Consequently, the response of the system will be determined exclusively by $U_2$ (code $c_1$, where the class regions are correctly separated.)

Finally, consider the case in which $U_1$ and $U_2$ are assigned equivalent priorities.

$c_1 \rightarrow U_1$ $c_2 \rightarrow U_2$ priority $(U_1)$ = priority $(U_2)$

In this case, both units begin to acquire P1 prototypes simultaneously. But once again, as incorrect prototypes have their influence fields reduced, the prototypes in $U_2$ are transformed to P2 prototypes, whereas in $U_1$, separate coverings of the a and b class territories develop. The responses of $U_1$ become more often unambiguous and correct; the commitment of P1 prototypes in both units ceases. Eventually the response of the system is solely based on the output of $U_1$.

B. Case II—Correlations Among Codes

In another example, consider a situation in which there are two codes and three classes, a, b and e. In code $c_1$, class a is well separated but classes b and e occupy the same region. In code $c_2$, however, b is well separated from neighboring classes but a and e overlap.

From the discussion of case I above, it is clear that, regardless of how priorities are assigned to the units implementing these codes, the system will be able to commit P1 prototypes in $c_1$ to separate and define class a, and, similarly, P1 prototypes in $c_2$ to define class b. Further, the unit implementing $c_1$ will dominate the system response for type a patterns, while the unit for $c_2$ will control the system response for b patterns. But, how will the system learn to discriminate examples of class e among its inputs?

The answer lies in the contribution of P2 prototypes. The unit for $c_1$ will be unable to sustain P1 prototyes for either b or e in region (b,e). Similarly, the unit for $c_2$ will be unable to keep P1 prototypes for a or e in region (a,e). Regardless of how the priorities are assigned to the units implementing codes $c_1$ and $c_2$, both regions (b,e) in $c_1$ and (a,e) in $c_2$ will become covered by P2 prototypes for e. These coverings will be, at minimum, complementary in the following sense. Assume, for argument's sake, that the unit for $c_1$ has the higher priority. System training will have produced a covering of the (b,e) region such that, upon presentation of an example of e, $U_1$'s response will be either UNCERTAIN in e, or UNCERTAIN in b or e. Since we have already indicated that no P1 prototype will have survived in region (a,e) of $c_2$, it is impossible for $U_2$ to dominate the system output. Vote-counting will turn a $U_1$ response of UNCERTAIN in e into a system classification of e. If, on the other hand, $U_1$'s response in UNCERTAIN in b or e, then the complementarity of the mapping developed in $c_2$ will assure that its response will be either UNCERTAIN in e or UNCERTAIN in a or e. In either case, vote-counting will combine responses from both units into the classification response, e. In this example, the system has learned how to correlate the responses of several units to separate and classify a pattern category that is not separated in any code.

C. An Example Problem from Character Recognition

We consider finally a simple illustration of this system applied to a problem in character recognition. Suppose that we wished to train the system to recognize the three block letters H, I and □. We choose a very simple set of codes for the coding units. Define $c_1$ to be a code that, in one dimension, counts the number of horizontal line segments in a pattern, and in another dimension records the ratio of the average length of the horizontal segments to the longest such segment. Let $c_2$ be a code that records the same information but for the vertical segments in the pattern.

Clearly in the case of the three letters we have chosen, when drawn in block form, the pattern class territories in $c_1$ (horizontal segments) distinguish between H (one segment), on one hand, and I and □ (two segments), on the other. The pattern class territories in $c_2$ (vertical segments) distinguish between I (one segment), on one hand, and H and □ (two segments), on the other.

This is an example of Case II discussed above where H is class a, I is class b and □ is class e. Here, the a region in $c_1$ is a point and the (b,e) region is a set of points in a line. In the $c_2$ code, the b region is a point and the (a,e) region is a line. It should be noted that, in the discussion of case II, no restrictions were placed on the geometries of the class territories.

Regardless of which units implement which codes, system memory will develop to cover the point for H in $c_1$ with a P1 prototype. Similarly, training will result in a P1 prototype covering the point representing I in $c_2$. The two line regions in $c_1$ and $c_2$ will be covered by a complementary P2 mapping for □. Consequently and without the aid of specific instruction to do so, the system will have learned to select individual separating codes for H and I and to correlate information from both codes to learn the character class □.

These has thus been shown and described a novel parallel, multi-unit, adaptive nonlinear pattern class separator and identifier which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are intended to be covered by the claims which follow.

APPENDIX

Glossary of Terms

Class:

A conceptual definition of a group of patterns which elicits the same response from a pattern class separator and identifier. All vector signals S representing patterns within this group will produce the identical output response R. A Nestor adaptive module does not have any preset or preconceived classes before it is trained.

Classification Unit:

One of a number of conceptually (or physically) separate units of the system. These units operate in parallel, or in sequence, and each comprise both an encoding portion and a classification portion. The encoding portion transforms the vector signal S into an encoded vector signal F; the classification portion attempts to translate the vector signal F into a unique output response R identifying the class of the input pattern represented by the vector signal S. Each classification unit is designated by its own hierarchy level or "priority" within the system.

Confusion Zone:

An area in multi-dimensional pattern space associated with more than one pattern class. Typically, such areas are covered with at least two overlapping layers of phase 2 prototypes, each layer being associated with a different class. In some cases, these zones may also be covered by overlapping influence fields of phase 1 prototypes for different classes.

Correlation:

The selection of the correct class from among several output responses of a number of Nestor adaptive modules, each of which has been presented with an encoded vector signal F representing the same input pattern.

Encode:

A transformation of an incoming vector signal S, representing an input pattern, into an encoded vector signal F, using a code "c". The transformation depends upon the presence or absence of particular features in the pattern. The purpose of the transformation is to eliminate irrelevant information contained in the signal S.

Event:

A real world occurence which may be detected and represented by a vector signal S. For example, the event may be a visual pattern, detectable by a camera, or a sound pattern, detectable by a microphone. The term "event" may be used synonomously with "pattern".

Influence Field of a Prototype:

A variable-sized region or territory in the multi-dimensional pattern space centered on a prototype. Upon presentation, an input pattern that falls within this territory will cause the prototype to fire.

Neighbor Search:

A search within a Nestor adaptive module for neighboring prototypes within a certain distance, in the multi-dimensional pattern space, from the point representing an input pattern.

Nestor Adaptive Module:

A device or method disclosed and claimed in one or more of the following U.S. Pat. Nos. 3,950,733; 4,044,243; 4,254,474 and 4,326,259.

Pattern:

A particular set of data, resulting from a real world "event" and represented by a vector signal S, which is to be classified by a pattern class separator and identifier. Although each pattern presented to the pattern class separator and identifier may be at least slightly different from every other pattern previously presented, it can be grouped into one of an arbitrary number of classes.

Pattern Signal:

A vector signal S comprised of individual scalar signals $s_1, s_2 \ldots s_k$, which represents an input pattern to a pattern class separator and identifier.

Phase 1 Prototype:

A type of prototype which, when "fired", will direct the response of a Nestor adaptive module and cause a particular output response to occur.

Phase 2 Prototype:

A type of prototype which, when "fired", can only indicate that an incoming pattern *may* fall within a designated one of a number of classes.

Prototype:

A prototypal representation of a pattern as stored in a Nestor adaptive module memory. Each prototype is defined in memory by (1) a vector in the multi-dimensional pattern space; (2) a "region of influence" within the pattern space; (3) a particular pattern class with which the prototype is associated; and (4) a label specifying the phase of the prototype.

Prototype "Commitment":

The establishment of a new prototype (either phase 1 or phase 2 prototype) in a Nestor adaptive module in association with, and as a result of the presentation of, an input pattern. Upon presentation, during training, every input pattern will either fall within the influence field of an existing prototype, or cause the formation of a new prototype.

To "Fire" a Prototype:

A prototype is said to "fire" when an input pattern, represented by a vector signal S, falls within the influence field of that prototype. This causes the Nestor adaptive module, in which the prototype resides, to produce an output response.

System Level:

A collection of classification units having the same priority.

Vote Counting:

A correlation technique which is used when an input pattern falls within a "confusion zone" in the multidimensional pattern space.

What is claimed is:

1. A system for classification and identification of patterns, each pattern being represented by an input signal S, said system comprising:
(a) a plurality of classification units $U_1, U_2 \ldots U_i \ldots U_k$, each unit $U_i$ including:
   (1) pattern feature encoding means, responsive to said signal S, for producing an intermediate signal $F_i$ ($F_1, F_2 \ldots F_i \ldots F_k$) representative of features contained in the pattern represented by said signal S, each intermediate signal $F_i$ comprising a plurality of signal components ($f_{1i}, f_{2i}, \ldots f_{ii} \ldots f_{Mi}$); and
   (2) pattern classification means, responsive to said intermediate signal $F_i$, for producing an output signal $R_i$ ($R_1, R_2 \ldots R_i \ldots R_k$), representative of a proposed respective class of said pattern represented by said signal S as identified by the features represented by said intermediate signal $F_i$; and
(b) class selection means, responsive to all of said output signals $R_i$ produced by said classification units $U_i$, for producing a single output response R representing the class of said pattern.

2. The system defined in claim 1, wherein each pattern feature encoding means encodes a different set of features in said pattern, whereby all of said intermediate signals $F_i$ produced by said encoding means are unique and different from each other.

3. The system defined in claim 1, wherein each pattern classification means classifies said pattern with respect to a different set of classes, whereby all of said output signals $R_i$ produced by said classification means are unique and different from each other.

4. The system defined in claim 1, wherein said class selection means includes means for selecting the output signal $R_i$ which best represents an identifiable pattern class.

5. The system defined in claim 1, wherein said pattern classification means is a Nestor adaptive module.

6. The system defined in claim 5, wherein said Nestor adaptive module comprises:
   (1) a plurality M of input terminals each coupled to receive one scalar component $f_i$ ($f_1, f_2 \ldots f_i \ldots f_M$) of an intermediate signal F;
   (2) a plurality N of summing means, each summing means having M inputs and an output and being operative to produce a scalar component signal $r_j$ ($r_1, r_2 \ldots r_j \ldots r_N$) at its output representing the sum of the signal representations applied to its inputs;
   (3) a plurality N of threshold devices, each coupled to one of said summing means, for producing a scalar output response $p_i$ ($p_1, p_2 \ldots p_i \ldots p_N$) when the scalar component signal applied thereto exceeds a prescribed threshold level $\theta_i$; and
   (4) a plurality MXN of junction elements, each junction element coupling one of said input terminals with one of said summing means and providing a transfer of information from the respective input terminal to the respective summing means in dependence upon the signal appearing at the respective input terminal and upon the junction element transfer function,
   whereby the respective scalar output responses $p_1, p_2 \ldots p_N$ are components of the output response R of said module.

7. The system defined in claim 6, wherein said Nestor adaptive module further comprises a plurality N of scalar multipliers, each coupled between one of said summing means and its associated threshold device, for producing a scalar component signal $\lambda r_i$, where $\lambda$ is a multiplier factor.

8. The system defined in claim 7, further comprising means for modifying said multiplier factor $\lambda$ of at least one of said scalar multipliers, when in a training mode, so as to avoid ambiguous class separation and identification.

9. The system defined in claim 6, further comprising means for modifying the transfer function of at least one of said junction elements, when in a training mode, in dependence upon the incoming signal applied thereto and the output signal of the summing means with which said respective junction element is associated.

10. The system defined in claim 6, further comprising means for modifying said threshold level $\theta$, when in a training mode, so as to avoid ambiguous class separation and identification.

11. The system defined in claim 1, wherein said class selection means is a Nestor adaptive module.

12. The system defined in claim 11, wherein said Nestor adaptive module comprises:
   (1) a plurality M of input terminals each coupled to receive one scalar component $f_i$ ($f_1, f_2 \ldots f_i \ldots f_M$) of an intermediate signal $F_i$;
   (2) a plurality N of summing means, each summing means having M inputs and an output and being operative to produce a first scalar component signal $r_j$ ($r_1, r_2 \ldots r_j \ldots r_N$) at its output representing the sum of the signal representations applied to its inputs;
   (3) a plurality N of threshold devices, each coupled to one of said summing means, for producing a scalar output response $p_i$ ($p_1, p_2 \ldots p_i \ldots p_N$) when the scalar component signal applied thereto exceeds a prescribed threshold level $\theta_i$; and
   (4) a plurality MXN of junction elements, each junction element coupling one of said input terminals with one of said summing means and providing a transfer of information from the respective input terminal to the respective summing means in dependence upon the signal appearing at the respective input terminal and upon the junction element transfer function,
   whereby the respective scalar output responses $p_1, p_2 \ldots p_N$ are components of the output response R of said module.

13. The system defined in claim 12, wherein said Nestor adaptive module further comprises a plurality N of scalar multipliers, each coupled between one of said summing means and its associated threshold device, for producing a scalar component signal $\lambda r_i$, where $\lambda$ is a multiplier factor.

14. The system defined in claim 13, further comprising means for modifying said multiplier factor $\lambda$ of at least one of said scalar multipliers, when in a training mode, so as to avoid ambiguous class separation and identification.

15. The system defined in claim 12, further comprising means for modifying the transfer function of at least one of said junction elements, when in a training mode, in dependence upon the incoming signal applied thereto and the output signal of the summing means with which said respective junction element is associated.

16. The system defined in claim 12, further comprising means for modifying said threshold level $\theta$, when in a training mode, so as to avoid ambiguous class separation and identification.

17. The system defined in claim 1, wherein said pattern classification means includes memory means for storing a plurality of prototypes within a multi-dimensional pattern space, and means for comparing an input pattern, represented by said intermediate signal F, with each of said prototypes stored in said memory means, to determine whether said input pattern falls within a region of influence of at least one of said prototypes.

18. The system defined in claim 17, wherein each prototype includes, as prototype information stored in said memory means, a vector location in said multi-dimensional pattern space; a scalar distance defining the size of a region of influence about said vector location in said pattern space; and a particular class with which said prototype is associated; and wherein said comparing means includes means for determining whether the location of said input pattern in said pattern space falls within the region of influence of one or more of said prototypes, and for producing a response indicative of the class associated with such prototype if said input pattern falls within the region of influence thereof.

19. The system defined in claim 18, wherein each prototype is designated by one of at least two types, said designated type being stored in said memory means for its associated prototype as a part of said prototype information, wherein a first type of prototype produces a first output signal $1R_i$ indicative of the certain recognition of the class of an input pattern that falls within the region of influence thereof, and wherein a second type of prototype produces a second output signal $2R_i$ indicative of a possible, but not certain recognition of the class of an input pattern that falls within the region of influence thereof.

20. The system defined in claim 19, wherein said class selection means includes means for selecting, as said output response R, one of a plurality of output signals produced by said pattern classification means.

21. The system defined in claim 20, wherein each pattern classification means is assigned a prescribed priority indicative of a hierarchy level, and wherein said selecting means selects, as said output response R, the first output signal $1R_i$ produced by said classification means which has the highest priority, said first output signal being indicative of certain recognition of a particular class by said classification means.

22. The system defined in claim 21, wherein said selecting means includes means for (1) counting the numbers of each class indicated by the second output signal $2R_i$, produced by each successive classification means in order of priority, until one class has a majority count, whenever no classification means produces a first output signal $1R_i$, and (2) producing said output response R indicative of said majority class.

23. The system defined in claim 18, wherein said pattern classification means further includes means for modifying said prototype information in said memory means, when in the training mode, in response to the receipt of an input pattern.

24. The system defined in claim 23, wherein said means for modifying said prototype information reduces said scalar distance of a prototype if an input pattern falls within the region of influence of such prototype, thereby producing a response $R_i$ indicative of the class associated with such prototype, when the class is incorrect, said scalar distance being reduced sufficiently so that said input pattern falls outside of said region of influence of such prototype.

25. The system defined in claim 24, wherein said scalar distance is reduced to a value substantially equal to, but less than the distance between the vector locations in said pattern space of such prototype and said input pattern.

26. The system defined in claim 24, wherein each prototype is designated by one of at least two types, said designated type being stored in said memory means for its associated prototype as a part of said prototype information, wherein a first type of prototype produces a first output signal $1R_i$ indicative of the certain recognition of the class of an input pattern that falls within the region of influence thereof, and wherein a second type of prototype produces a second output signal $2R_i$ indicative of a possible, but not certain recognition of the class of an input pattern that falls within the region of influence thereof; and wherein said means for modifying said prototype information changes the designated type of a prototype from a first type to a second type when said scalar distance of such prototype is reduced below a prescribed threshold value.

27. The system defined in claim 26, wherein said means for modifying said prototype information expands said scalar distance of a given prototype out to the nearest region of influence of a prototype of said first type, whenever the designated type of such given prototype has been changed from a first type to a second type.

28. The system defined in claim 24, wherein said means for modifying said prototype information includes means for storing a new prototype in said memory means when an input pattern fails to fall within the region of influence of any previously stored prototype.

29. The system defined in claim 1, wherein said class selection means includes means for selecting, as said output response R, one of a plurality of output signals produced by said pattern classification means.

30. The system defined in claim 29, wherein each pattern classification means is assigned a prescribed priority indicative of a hierarchy level, and wherein said selecting means selects, as said output response R, the output signal produced by said classification means which has the highest priority.

31. The system defined in claim 1, wherein each output signal $R_i$ comprises a plurality of signal components $(r_{1i}, r_{2i} \ldots r_{ii} \ldots r_{Ni})$.

32. The system defined in claim 1, wherein said output response R comprises a plurality of signal components $(p_1, p_2, \ldots p_N)$.

* * * * *